United States Patent [19]

Herrington et al.

[11] 4,255,253

[45] Mar. 10, 1981

[54] HYDROGEN PROCESSING OF HYDROCARBON FEEDS USING COATED CATALYSTS

[75] Inventors: Daniel R. Herrington, Chesterland; Albert P. Schwerko, Solon; Serge R. Dolhyj, Parma; Wilfrid G. Shaw, Lyndhurst, all of Ohio

[73] Assignee: The Standard Oil Company, Cleveland, Ohio

[21] Appl. No.: 844

[22] Filed: Jan. 3, 1979

[51] Int. Cl.³ .............................................. C10G 45/08
[52] U.S. Cl. .................... 208/216 PP; 208/251 H; 208/254 H; 252/465; 252/477 R
[58] Field of Search ............. 208/213, 216 R, 216 PP, 208/107–112, 251 H, 254 H; 252/465, 477 R

[56] References Cited

U.S. PATENT DOCUMENTS

| | | | |
|---|---|---|---|
| 2,478,194 | 8/1949 | Houdry | 252/477 R |
| 2,507,496 | 5/1950 | Bond, Jr. | 252/477 R |
| 2,631,921 | 3/1953 | Odell | 208/213 |
| 3,264,228 | 8/1966 | Burbridge | 208/216 R |
| 3,420,784 | 1/1969 | Keith et al. | 252/475 |
| 4,009,125 | 2/1977 | Geierhaas et al. | 208/216 PP |
| 4,077,912 | 3/1978 | Dolhyj et al. | 252/461 |
| 4,083,771 | 4/1978 | O'Hara | 208/216 R |

*Primary Examiner*—Herbert Levine
*Assistant Examiner*—G. E. Schmitkons
*Attorney, Agent, or Firm*—William A. Heidrich; Herbert D. Knudsen; Larry W. Evans

[57] ABSTRACT

Catalysts consisting of a base support having a strongly adherent outer coating of an active catalytic material have been found to give superior results in known hydrogen processing reactions wherein sulfur, nitrogen and the metal content of a hydrogen feedstock are reduced.

14 Claims, 2 Drawing Figures

HYDROGEN PROCESSING OF HYDROCARBON FEEDS USING COATED CATALYSTS

BACKGROUND OF THE INVENTION

The present invention relates to a novel process for hydrogen processing of hydrocarbon feedstocks. More particularly, this invention relates to the use of a coated catalyst to reduce the sulfur, nitrogen and metal content of hydrocarbon feedstocks.

The preparation of surface-coated catalysts containing active catalytic oxide materials is disclosed in U.S. Pat. No. 4,077,912. This patent does not disclose that these coated catalysts are especially effective in hydrogen processing operations.

Hydrogen processing is a general term covering refinery processes with one thing in common—the use of hydrogen to improve hydrocarbon feedstocks. Processes of this type are hydrocracking, hydrogen refining and hydrogen treating.

Hydrogen processing of hydrocarbon feedstocks is well known in the art. For example, see *Hydrocarbon Processing*, pages 151 through 155 (August, 1977), and S. C. Schumann and H. Shalit, *Catal. Rev.* 4(2), 245 (1970). As can be seen from the art, these reactions normally involve the use of catalysts consisting of support materials impregnated with various catalytically active ingredients. Alternatively, the active ingredients and support are prepared together.

It is well known to those skilled in the art that there are several disadvantages with the prior art hydrogen processing reactions. First, hydroprocessing catalysts are deactivated by the deposition of metals, derived from organometallic components of the feed, on the outer portion of the catalyst particles. This is particularly true in the case of lead deposits on naphtha treating catalysts, vanadium deposits on catalysts for the hydrotreating of atmospheric gas oil, vacuum gas oils and vacuum residue, and iron sulfide deposits on catalysts for the hydrorefining of coal liquids and coal slurries.

Also, heat transfer limitations can be critical in hydrocracking operations involving highly exothermic reactions. With the catalysts of the prior art, excessive heat build-up in the interior of the catalyst particles leads to poor selectivity and the possibility of runaway exotherms.

The present invention is designed to alleviate these problems by the use of a coated catalyst as at least part of the reactor charge. Furthermore, although the activity of the coated catalyst would be comparable to a conventional catalyst, the catalyst cost would be substantially reduced since a large percentage of the reactor volume is being occupied by relatively cheap inert support.

In those reactions where the catalyst is deactivated by the formation of metal deposits on the catalyst surface, it would be extremely advantageous to replace at least a portion of the conventional hydrogen processing catalyst with a coated catalyst. The coated catalyst could be placed near the reactant inlet and serve as a repository for the undesirable metals in the feedstocks. Periodically, the coated catalyst could be replaced by fresh coated catalyst charge. Since the coated catalyst contains less of the active catalytic material than prior art catalysts, replacing coated catalyst would be less expensive than replacing prior art catalysts.

Finally, by employing coated catalysts in a hydrogen processing operation, one can achieve high heat transfer efficiency and thus maximize the control of selectivity and exotherm in the reactor.

SUMMARY OF THE INVENTION

It has now been discovered that coated catalysts give superior results in known hydrogen processing reactions.

Thus, the present invention provides an improvement in the process of hydrogen processing a hydrocarbon feedstock by contacting the hydrogen feedstock and hydrogen at an elevated temperature with a hydrogen processing catalyst, the improvement comprising using as at least a part of the catalyst a coated catalyst having:
(a) an at least partially porous base support of at least about 20 microns in diameter, said support having an outer surface, and
(b) a coating substantially on said outer surface, said coating consisting essentially of an active catalytic material containing an active catalytic oxide component and a coating support material, said coating strongly adhering to said outer surface of said base support.

These catalysts are referred to as "coated" catalysts and provide superior results in hydrogen processing of hydrocarbon feedstocks as compared to prior art catalysts.

DESCRIPTION OF THE DRAWING

The catalysts of the invention are illustrated in the Figures.

DETAILED DESCRIPTION

Figure 1:
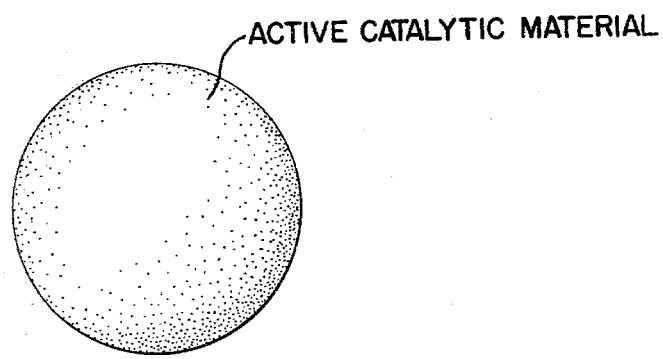
FIG. 1 shows a view of the catalyst of the present invention. The illustrated catalyst is a sphere with the entire outer surface of the sphere being the active catalytic material.
Figure 2:
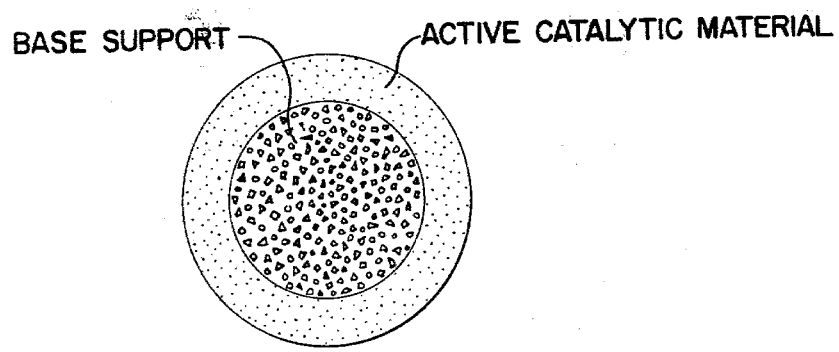
FIG. 2 shows a cross-sectional view of the spherical catalyst of FIG. 1 obtained by cutting the spherical catalyst in half. The catalyst consists of an inner core or base support and an outer coating of the active catalytic material. As can be readily seen from FIG. 2, the active catalytic material is distributed on the outside of the base support and is not distributed uniformly throughout the catalyst.

As noted in the Background of the Invention above, the hydrogen processing operations of the instant invention are well known in the art. The present invention relates to the use of a coated catalyst in these known reactions.

The coated catalysts of this invention can be obtained by the methods shown by Dolhyj and Milberger in U.S. Pat. No. 4,077,912, which is herein incorporated by reference. Broadly, this method involves partially wetting the base support material with a liquid. The support is then allowed to dry until the outside surface of the support is dry to the touch. The pre-wetted support is then contacted with a powder of the catalytically active material and the mixture is gently agitated until the catalyst is formed. If the outside surface of the support is wet, then the active catalytic material will agglomerate into separate aggregates when coating of the support is attempted.

The gentle agitation is most conveniently conducted by placing the partially wet support on a rotating drum and adding the active catalytic material until none is taken up by the support. This can be very economically done.

The liquid used to wet the support may include inorganic or organic liquids and is essentially dependent upon the type of active catalytic material employed. The liquid and the active catalytic material must have a relatively high degree of attraction for each other. For example, if a hydrophilic active catalytic material is used, water can be used to wet the support. On the other hand, if a hydrophobic catalytic material is used, either organic solvents such as petroleum, ethers and alcohols or inorganic support materials such as alumina or aluminum nitrate could be used. Water and alcohols are the preferred liquids.

More specifically, the catalyst of the invention is prepared by:

(a) contacting a base support of at least about 20 microns in diameter with an excess of liquid in such a manner that the liquid is absorbed by the support to produce a wet support, (b) drying said wet support to provide a partially wet support, which partially wet support is defined as one that does not have the appearance of liquid on the outer surface of the support, but has at least some liquid absorbed into the support, (c) contacting the partially wet support with a powder of an active catalytic material, and (d) gently agitating the mixture of the partially wet support and active catalytic material to produce the catalyst.

It can be readily seen that the first two steps can be combined by the addition of a measured amount of liquid that would give a partially wet support. Thus, there would be no need for the intermediate drying step.

In an alternate preparation technique, the partially wet base support of (b) above could be contacted with a powder of a coating support material. The resultant coated base support could then be calcined and impregnated with solutions containing precursors of active catalytic metal oxides.

As noted above, the catalyst of the present invention contains two discrete parts—a base support and an active catalytic material.

The base support can be selected from a wide choice of support materials known in the art. This base support material must have a diameter of at least about 20 microns. Preferably, the base support has a diameter of about 0.5 millimeters to about 10 millimeters, but there is no limitation on the maximum size of the base support material.

The base support material must be at least partially porous. By this is meant that the support material must be susceptible to the penetration of liquid. Preferred base support materials are capable of absorbing at least about 5% by weight of water based upon the weight of the support.

The base support materials used in the present invention are well known in the art and are either commercially available or can be conveniently prepared. For example, U.S. Pat. No. 3,145,183 (herein incorporated by reference) shows the preparation of support balls that are useful in the preparation of the catalyst of this invention. Also, base support materials can be prepared by compacting a suitable support material into the desired shape.

Although the attached drawing shows a spherical shaped base support, the instant base supports can be of any shape, e.g. saddle-shaped and tablet-shaped. Preferably, the base support has a spherical shape in order to minimize the pressure drop in the reactor.

Even though any support material can be used as the base support in the present invention, certain support materials are preferred. In this regard, the preferred base support comprises an essentially inert, low surface area material. Preferred are those support materials that have surface areas of less than 20 meter$^2$/gram. Especially preferred base supports have surface areas of less than 5 meter$^2$/gram.

The preferred base support materials include silica, alumina, alumina-silica, silicon carbide, titania, and zirconia. Especially preferred among these supports are silica, alumina and alumina-silica..

The second component of the catalyst of the present invention comprises any active catalytic material suitable for the particular desired catalytic application. This active catalytic material comprises a mixture of an active catalytic metal oxide and a coating support material. The active catalytic material can be about 0.5% to 95% by weight of the catalyst particle. Preferably, it is 5% to 60% by weight of the catalyst particle.

The active catalytic metal oxide used in the present invention are not novel in the present invention for these catalysts and their preparations are described in the prior art. For example, Idol in U.S. Pat. No. 2,904,580 shows catalysts containing oxides of bismuth and molybdenum; Sennewald in U.S. Pat. No. 3,226,422 shows catalysts containing oxides of iron, bismuth, phosphorus and molybdenum; Yamaguchi in U.S. Pat. No. 3,567,773 discloses catalysts containing oxides of molybdenum, vanadium and tungsten. These references are herein incorporated by reference.

The present invention is applicable to producing catalysts for use in all of the hydrogen processing operations known, and to this end the active catalytic metal oxide of this invention can be any metal oxide or mixture of metal oxides known to or capable of catalyzing a hydrogen processing reaction. The preferred active catalytic metal oxide is one or more oxides such as from the group consisting of cobalt, nickel, molybdenum, tungsten, vanadium, palladium, platinum and iron.

The coating support material can also be selected from a wide choice of support materials known in the art. The coating support material can be the same as or different from the base support material. In fact, any support material which is stable under the reaction conditions is within the scope of the instant invention. Preferably, the coating support material is a high surface area material and has a surface area of greater than 20 meter$^2$/gram. Most preferably, the surface area is greater than 100 meter$^2$/gram. Coating support materials that have been found to be particularly effective when combined with the active catalytic metal oxides prior to coating are activated carbon and either $\gamma$-alumina or precursors of $\gamma$-alumina.

The active catalytic material may contain from 0.05% to 75% by weight active catalytic metal oxides based on the total weight of the active catalytic material. Preferably, the active catalytic material contains from 0.1% to 40% by weight active catalytic metal oxides.

As discussed above, the active catalytic materials suitable for the instant invention are known in the art. For example, the coating for a hydrotreating catalyst can consist of a high surface area alumina or silica-alumina containing active transition metal oxides such as 10 to 30 weight percent $MoO_3$ promoted with 3 to 10 weight percent CoO and/or 3 to 10 weight percent NiO. The coating for a coal hydrogenation catalyst can contain a mixture of nickel and tungsten oxides or the halides thereof in conjunction with high surface area alumina or silica-alumina. The coating for a hydrocracking catalyst can consist of a high surface area amorphous silica-alumina or a crystalline alumina-silica such as synthetic or naturally occurring zeolite in combination with active metal oxides of nickel/molybdenum, nickel/tungsten, nickel, iron, cobalt, platinum or palladium.

The coated catalyst of this invention can be employed in a fixed-bed or moving-bed reactors. Process conditions would depend on the feedstock being treated. Conditions for hydrogen processing operations generally include temperatures ranging from 200° C. to 600° C. with temperatures from 300° C. to 425° C. being preferred. The hydrogen processing reactions can be carried out in the vapor phase or liquid phase at pressures in the range of 100 psig to 10,000 psig, preferably 200 psig to 3,000 psig. The reactant feed contains the hydrocarbon and hydrogen in essentially any ratio desired.

As discussed above, the hydrogen processing operations of this invention are well known. Such reactions are employed primarily in the refining of crude oil and its fractions. However, hydrogen processing may also be employed with liquids derived from non-petroleum sources such as coal, tar sands or oil shale.

The coated catalyst may be employed as 100% of the total reactor charge. In an alternate embodiment, the coated catalyst may be used in conjunction with a conventional hydrogen processing catalyst, in which case the amount of coated catalyst would be some fraction of the total reactor charge and the coated catalyst could be either intimately mixed with the conventional catalyst or employed as a separate layer within the reactor.

SPECIFIC EMBODIMENTS

In order to more thoroughly describe the present invention, the following working examples are presented.

Comparison A: Preparation of Extruded Hydrotreating Catalyst 1,000 grams of both $Al_2O_3 \cdot 3H_2O$ and a 30 weight percent colloidal alumina sol were blended together and the resulting mixture was heated to a form a thick paste. This material was extruded and dried at 110° C. to form 3/32 inch diameter extrudates. The product was calcined for four hours at 425° C., after which the final weight was 621.2 grams. This material was then impregnated with a solution of 89.5 grams $Co(NO_3)_2 \cdot 6H_2O$ and 141 grams $(NH_4)_6Mo_7O_{24} \cdot 4H_2O$ in 340 milliliters concentrated $NH_4OH$. The resulting product was dried at 120° C. for 18 hours and calcined at 425° C. for 2 hours.

EXAMPLE 1

Preparation of Coated Hydrotreating Catalyst 50 grams of ⅛ inch diameter alundum spheres were wetted with 12 grams of a 30 weight percent alumina sol. The wetted spheres were tumbled in a jar until the surface of the alundum particles appeared dry. A mixture of 50 grams of the active catalytic material prepared in Comparison A, which has been ground to a uniform powder, was added to 17 grams of $Al(NO_3)_3 \cdot 9H_2O$. The dry appearing alundum particles were then rolled in 3 grams of this mixture for about 10 minutes. This step was then repeated with another 3 gram portion of the mixture. The rolling was done in a glass jar rotated at a slightly inclined angle from horizontal. The rotating action provided sufficient agitation so that the active catalytic material formed a substantially uniform coating on the alundum support. The active catalytic material did not permeate the support. The coated catalyst was then dried at 110° C. and calcined for 4 hours at 425° C. A 91 cm³ portion of this catalyst weighed 102.5 grams and contained 52.5 grams of active catalyst.

The following Table compares the physical properties of the extrudate catalyst of Comparison A, the coated catalyst of Example 1, and a commercial $CoO/MoO_3/Al_2O_3$ hydrotreating catalyst.

TABLE 1

| | Ex. I Coated Catalyst | Comparison A Extrudate Catalyst | Commercial Hydrotreating Catalyst |
|---|---|---|---|
| Particle Diameter (in.) | 3/16 | 3/32 | 1/16 (extrudate) |
| Specific Surface Area (m²/gm) | 65 | 227 | 250 |
| Pore Volume (cm³/gm) | 0.20 | 0.53 | 0.50 |
| Apparent Bulk Density (gm/cm³) | 0.58 | 0.80 | 0.74 |

EXAMPLE 2

Catalyst Evaluation in Naphtha Hydrotreating

A 50 cm³ charge of the coated catalyst prepared in Example 1 was used to desulfurize naphtha in a 1 inch diameter reactor under conditions simulating a commercial naphtha treater. The feed, which consisted of 95 volume percent straight run naphtha and 5 volume percent coker distillate, was hydrotreated at 332° C. with a total pressure of 255 psig, a corresponding $H_2$ partial pressure of 119 psig, a hydrogen to feed ratio of 741 SCF/BBL, and a liquid hourly space velocity of 4.0 volume feed/volume reactor charge/hour. A 50 cm³ reactor charge of the commercial $CoO/MoO_3/Al_2O_3$ hydrotreating catalyst was evaluated in an identical fashion. Under these conditions, the product from the commercial catalyst contains 1.8 ppm sulfur, whereas the product from the coated catalyst contained only 0.6 ppm sulfur. In both cases, the feed contained 284 ppm sulfur. Despite the fact that the reactor charge of coated catalyst contained only 51 weight percent active material, it gave a naphtha product with a lower sulfur content. When calculated on the basis of active catalyst, the coated catalyst removed 10.0 ppm sulfur per gram of active catalyst compared to 6.6 ppm sulfur per gram of active catalyst for the commercial hydrotreating catalyst.

EXAMPLE 3

Catalyst Evaluation in Vacuum Gas Oil Hydrotreating

A 50 cm³ charge of the coated catalyst prepared in Example 1, diluted with an equal volume of 12 to 20 mesh alundum chips, was used in a 1 inch diameter reactor to hydrotreat a light Iranian vacuum gas oil containing 1.55 weight percent sulfur. The conditions were as follows: 371° C., 500 psig, 3,500 scf $H_2$/bbL feed, and a liquid hourly space velocity ranging from 1.0 to 4.0 volume feed/volume reactor charge/hour. 50 cm³ of the extrudate catalyst of Comparison A was also diluted with an equal volume of 12 to 20 mesh alundum chips and evaluated in identical fashion. The results are shown in Table 2 below.

TABLE 2

| | Weight Percent Sulfur Removal | |
|---|---|---|
| LHSH (V/V/Hr) | Example 1 Coated Catalyst | Comparison A Extrudate Catalyst |
| 1.0 | 84.5 | 83.9 |
| 2.0 | 66.4 | 74.2 |
| 3.0 | 54.2 | 63.2 |
| 4.0 | 45.8 | 56.8 |

While the extrudate catalyst of Comparison A outperforms the coated catalyst to some extent at the higher space velocities, the coated catalyst demonstrates superior activity at a space velocity of 1.0 despite the fact that it contains only 51 weight percent active material. The higher operating efficiency of the coated catalyst can be demonstrated more clearly by expressing the above data in terms of weight percent sulfur removal per gram of active catalyst. This is shown in Table 3 below.

TABLE 3

| | Wt. % Sulfur Removal/Gram of Active Catalyst | |
|---|---|---|
| LHSV (V/V/Hr) | Example 1 Coated Catalyst | Comparison A Extrudate Catalyst |
| 1.0 | 2.9 | 2.1 |
| 2.0 | 2.3 | 1.8 |
| 3.0 | 1.9 | 1.6 |
| 4.0 | 1.6 | 1.4 |

The above data clearly shows that the coated catalyst of Example 1 outperforms the extrudate catalyst of Comparison A per gram of active catalyst.

Although only a few embodiments of the present invention have been specifically described above, it should be appreciated that many additions and modifications can be made without departing from the spirit and scope of the invention. These and all other modifications are intended to be included within the scope of the present invention, which is to be limited only by the following claims:

We claim:

1. In the process of hydrogen processing of hydrocarbon feedstocks by contacting the hydrocarbon feedstock and hydrogen at an elevated temperature with a hydrocarbon processing catalyst, the improvement comprising using as at least a part of the catalyst a coated catalyst prepared by:
   (a) contacting a base support of at least about 20 microns in diameter with an excess of liquid in such a manner that the liquid is absorbed by the support to produce a wet support,
   (b) drying said wet support to provide a partially wet support,
   (c) contacting the partially wet support with a powder of an active catalytic material, and
   (d) gently agitating the mixture of the partially wet support and active catalytic material to produce the catalyst.

2. The process of claim 1 wherein the coated catalyst is substantially spherical.

3. The process of claim 2 wherein said substantially spherical catalyst has a diameter of 0.5 mm to 10 mm.

4. The process of claim 3 wherein said substantially spherical catalyst has a diameter of 1 mm to 5 mm.

5. The process of claim 1 wherein sulfur is removed from the hydrocarbon feedstock.

6. The process of claim 1 wherein nitrogen is removed from the hydrocarbon feedstock.

7. The process of claim 1 wherein metals are removed from the hydrocarbon feedstock.

8. The process of claim 1 wherein the active catalytic material comprises about 5% to 60% by weight of the catalyst particle.

9. The process of claim 1 wherein the active catalytic material contains one or more oxides selected from the group consisting of cobalt, nickel, molybdenum, tungsten, vanadium, palladium, platinum and iron.

10. The process of claim 9 wherein the active catalytic material contains one or more oxides selected from the group consisting of cobalt, nickel and molybdenum.

11. The process of claim 1 wherein the catalyst charge comprises at least 20% by weight of said coated catalyst.

12. The process of claim 1 wherein the catalyst charge comprises at least 50% by weight of said coated catalyst.

13. The process of claim 1 wherein essentially all of the catalyst charge comprises said coated catalyst.

14. The process of claim 1 wherein the active catalytic material comprises about 50% by weight of the catalyst particle.

* * * * *